April 28, 1931.  J. W. PARKER  1,803,283
MEASURING MACHINE MICROMETER
Filed June 18, 1928   2 Sheets-Sheet 1
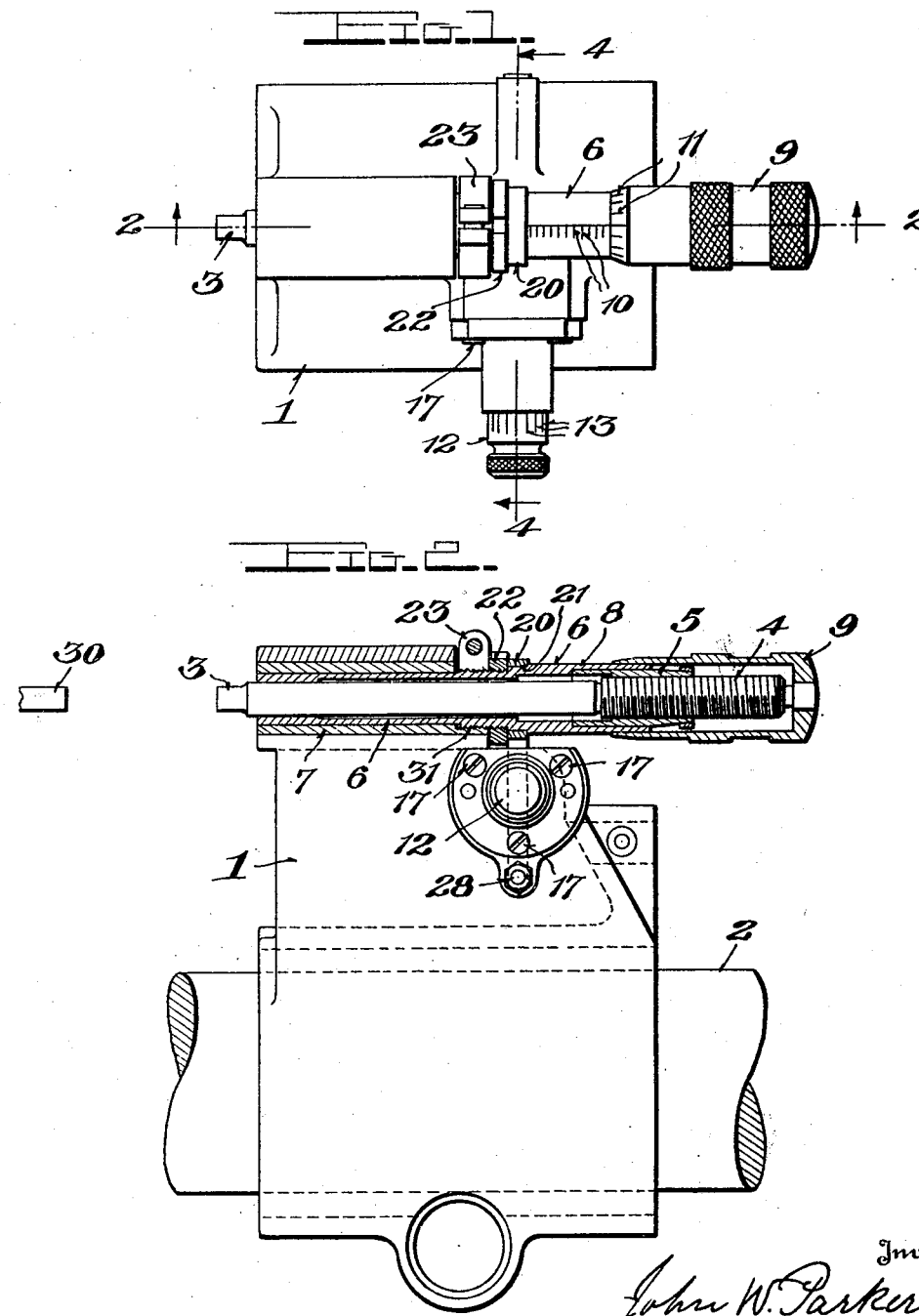
Inventor
John W. Parker
By Joseph A. Miller
Attorney April 28, 1931.  J. W. PARKER  1,803,283
MEASURING MACHINE MICROMETER
Filed June 18, 1928  2 Sheets-Sheet 2
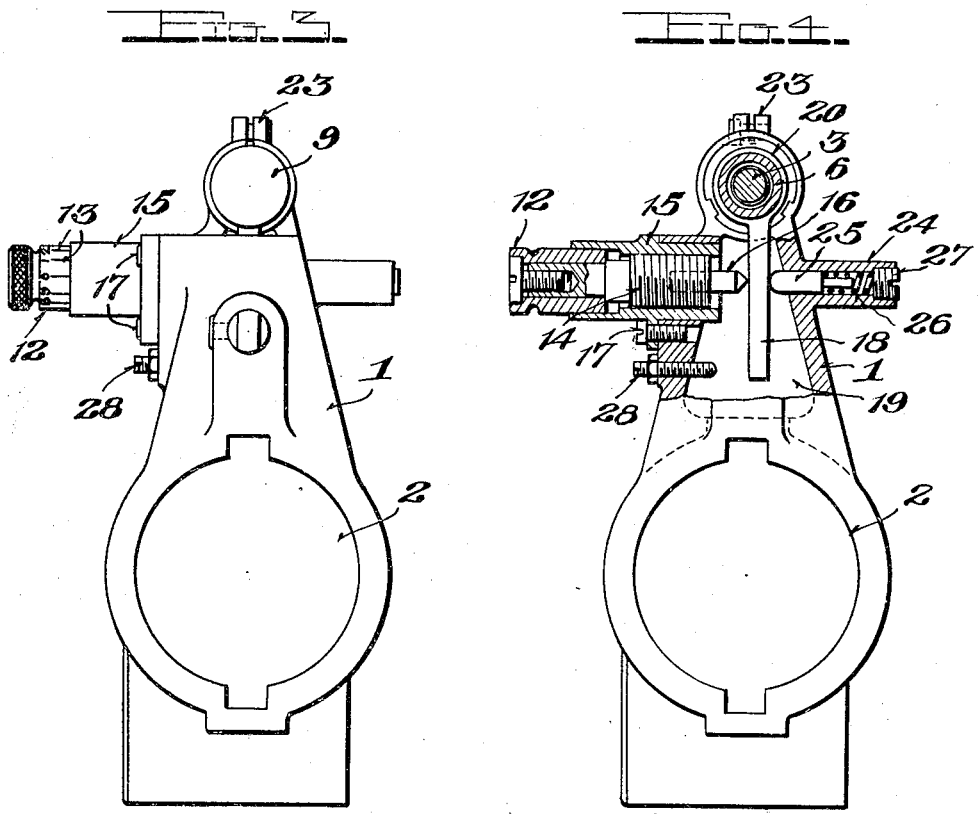
Inventor
John W. Parker
By Joseph A. Miller
Attorney Patented Apr. 28, 1931

1,803,283

UNITED STATES PATENT OFFICE

JOHN W. PARKER, OF BARRINGTON, RHODE ISLAND, ASSIGNOR TO BROWN & SHARPE MFG. CO., OF PROVIDENCE, RHODE ISLAND

MEASURING-MACHINE MICROMETER

Application filed June 18, 1928. Serial No. 286,132.

This invention relates to certain new and useful improvements in a measuring machine micrometer, and the primary object thereof is to provide a micrometer of this type which is applied to the tailstock of the machine and which is adapted to give direct reading to one ten thousandth of an inch.

In the drawings:—

Figure 1 is a top plan view of the invention;

Figure 2 is a section on line 2—2 of Figure 1;

Figure 3 is an end elevation, and

Figure 4 is a section on line 4—4 of Figure 1.

In proceeding in accordance with the present invention, a support or frame 1 is employed and which may be supported by a rod 2. The frame 1 is provided with a measuring spindle 3 which latter is threaded at its rear end as indicated at 4 to engage with the measuring nut 5, the nut 5 in turn being mounted within a sleeve 6, the latter sleeve being mounted within an outer sleeve 7 and having threaded engagement therewith as shown at 31. As shown in Figure 2 of the drawings, the rear end of the sleeve 6 is counter-bored as shown at 8 in order to receive the measuring nut 5 therein. A thimble 9 is secured to the rear end of the spindle 3 so that rotation of the thimble effects corresponding longitudinal movement of the spindle. As shown in Figure 1 of the drawings, the sleeve 6 is provided with graduations 10 which latter co-operate with graduations 11 on the thimble 9 whereby it will be noted that the extent of movement of the spindle can be read on the sleeve 6, the graduations 11 being one ten-thousandth of an inch.

In order to sub-divide these readings, of the thimble 9, a second measuring thimble 12 is employed which latter has graduations 13 thereon as depicted in Figures 1 and 3 of the drawings, these graduations being to one tenth of one thousand. The thimble 12 has its inner end 14 threaded into a sleeve 15 which latter is received in a bore provided therefor in the upper portion of the frame 1, and has a point 16 secured thereto. The sleeve 15 is rigidly secured to the frame 1 by means of screws 17. The point 16 bears against a lever 18 which latter operates within a chamber 19 formed in the upper portion of the frame 1. The lever 18 has an eccentric head 20, which latter is of ring-like form and is mounted in a groove 21 formed in the periphery of the sleeve 6. The head 20 is rigidly secured to the sleeve 6 by means of a nut 22, which is driven thereagainst, the nut in turn being held in position by a clamp 23. It will thus be seen that swinging movements of the lever will be imparted to the sleeve 6. As shown in Figure 4 of the drawings, the frame 1 is provided with a lateral sleeve-like extension 24 which has a pin 25 slidable therein and tensioned by a spring 26, the spring being held in position by a threaded head 27. The pin 25 presses against the lever 18 so as to constantly hold the latter in contact with the point 16. An adjustable stop pin 28 is carried by the frame 1 and engages the lever 18 so as to restrict swinging movement thereof.

In operation, if it is desired to measure a distance of 3.7624" the thimbles 9 and 12 are set at zero. As shown in Figure 2, a second spindle 30 is disclosed disposed opposite to the spindle 3. A rod of 3" in length is engaged by and between the spindles 3 and 30 so that the distance therebetween is thus initially 3".

To obtain the .762 setting, the spindle 3 is rotated until same has been advanced .762 of an inch. This still leaves a distance of four ten thousandths of an inch to be obtained, which setting is secured by rotating the thimble 12 until the graduations 13 indicate that the measuring spindle 3 has been moved the additional four ten thousandths of an inch. The operator now has the machine set up to measure 3.7624".

In the foregoing operation, it will be noted that the rotation of the spindle 3 does not affect the sleeve 6, which latter remains quiescent. However, when the thimble 12 is rotated to move the lever 18, the latter effects rotation of the sleeve 6 due to the latter being threaded at 31 into engagement with the stationary sleeve 7. In its rotation, the sleeve 6 carries with it the spindle 3. It will thus be seen that the connection between the primary micrometer and the secondary micrometer is a permanent one, so that such connection is not required to be connected to or disconnected from the primary micrometer or from the thimble 12 of the secondary micrometer.

Having thus described my invention what I claim as new and desire to secure by Letters Patent is:

1. In a measuring device, a support, a stationary sleeve carried by the support, a second sleeve within the first sleeve and having threaded engagement therewith, a measuring spindle in the second sleeve, a nut threaded on the spindle and carried by the second sleeve, a thimble connected to the spindle, a lever rigidly connected to the second sleeve, a sleeve disposed at right angles to the spindle and having a rotary thimble threadedly connected thereto, a pin carried by the latter thimble and engaged with the lever to move the same upon rotation of the last named thimble, and a spring pressed device carried by the support and engaged with the lever to hold same engaged with said pin.

2. In combination with a support, a primary micrometer carried by the support and having a rotatable graduated sleeve and a rotatable spindle within and rotatable independently of the sleeve, means to connect the spindle and the sleeve to permit the spindle to rotate and thereby be advanced while the sleeve remains stationary, means associated with the support, to advance the sleeve with the spindle upon rotation of the sleeve, a lever having permanent fixed connection with the sleeve, a secondary micrometer having a spindle engaged with the lever to actuate the same, and means to hold the lever engaged with said spindle of the secondary micrometer.

3. In combination with a support, a primary micrometer carried thereby and having a spindle, and a rotary sleeve, a secondary micrometer, means to mount the spindle in the sleeve whereby the spindle has movement independent of movement of the sleeve, means associated with the support whereby upon rotation of the sleeve the latter is caused to move and therewith the spindle, and means to operate the sleeve by the secondary micrometer.

4. In combination with a support, a primary micrometer movably carried thereby and having a pair of cooperating relatively movable means one of which is a work contacting means, means to connect said pair of means to enable one of the pair thereof to move independently of the other, means associated with the support whereby upon movement of the said other of said pair both of the pair are caused to move in unison, a secondary micrometer, and means operable by the secondary micrometer to effect movement of said other of the pair of means thereby to cause both of the pair to move in unison.

5. In combination with a support, a primary micrometer carried by the support and bodily movable with respect thereto, a secondary micrometer carried by the support, means for bodily moving the primary micrometer permanently connected thereto, and operable by the secondary micrometer, means associated with the support for advancing the primary micrometer upon movement of said moving means thereof, and means whereby the primary micrometer is operable independently of said moving means and while the latter remains permanently connected to the primary micrometer.

6. In a measuring device, a support, a primary micrometer carried by the support and having a rotary sleeve and a rotary spindle within and movable independently of the sleeve, a lever fixedly connected to the sleeve to rotate the same, means associated with the support for advancing the sleeve and therewith the spindle upon rotation of the sleeve, a secondary micrometer having a stationary sleeve secured to the support, and a rotary spindle in said stationary sleeve engaging the lever for operating the same.

In testimony whereof I have signed my name to this specification.

JOHN W. PARKER.